United States Patent [19]

Boyer et al.

[11] 4,227,239

[45] Oct. 7, 1980

[54] WIRE ROUTING CHANNEL

[75] Inventors: Ronald G. Boyer, Peoria; Arthur E. Olt, Jr., Pekin, both of Ill.

[73] Assignee: Caterpillar Tractor Co., Peoria, Ill.

[21] Appl. No.: 83,995

[22] PCT Filed: Apr. 12, 1979

[86] PCT No.: PCT/US79/00226

§ 371 Date: Apr. 12, 1979

§ 102(e) Date: Apr. 12, 1979

[51] Int. Cl.³ .............................................. H02B 1/04
[52] U.S. Cl. .................................... 361/422; 361/428; 180/90; 174/72 A
[58] Field of Search ........................... 180/90; 296/70; 174/70 C, 72 A; 248/27.1; 361/331, 346, 347, 417, 419, 420, 427, 428; 337/202, 216

[56] References Cited

U.S. PATENT DOCUMENTS

| | | | |
|---|---|---|---|
| 2,227,993 | 1/1941 | Anderson | 361/428 |
| 2,423,597 | 7/1947 | Hurn | 180/90 |
| 2,594,010 | 4/1952 | Graham et al. | 361/428 |
| 3,088,055 | 4/1963 | Schwing | 361/428 |
| 3,174,576 | 3/1965 | Woofter | 174/72 A |
| 3,201,654 | 8/1965 | Clark et al. | 361/383 |
| 3,909,505 | 9/1975 | Taylor | 361/428 |

*Primary Examiner*—Gerald P. Tolin
*Attorney, Agent, or Firm*—Wegner, Stellman, McCord, Wiles & Wood

[57] ABSTRACT

A panel (10) is provided with an improved bracket assembly (20) for organizing the wiring of the panel and for protecting the electrical components (18) extending from the panel. The two-part (22,24) bracket assembly (20) provides a cable-receiving trough (23) from which the individual wires (46,48) are extracted and guided to a connection with the electrical components (18). Selected wires are provided with a grommet (52) which, in turn, are snapped into a keyhole slot (45) in the bracket (20) for supporting the selected wire and for protecting the electrical components from damage.

4 Claims, 4 Drawing Figures

WIRE ROUTING CHANNEL

DESCRIPTION

1. Technical Field

This invention relates to a wired panel and, more particularly, to a wired instrument panel.

2. Background Art

Wired panels and, in particular, dash panels for motor vehicles, tractors, and the like, have a constantly increasing number of dials, gauges, switches, fuse holders, and the like, which project through the panel and have indicator lights, and the like, associated therewith to indicate the operativeness of the individual element. Behind the panels are a large number of wires running every which way at random to the appropriate dials, gauges, switches, fuse holders, and the like. The result is a virtual rats nest of wires which wires, when the wiring of the panel has been completed, must be carefully tucked and pushed together so that the panel can be affixed in place on the dash prior to use. The random wiring of the panel, particularly where the wires are not supported or organized in any way, has a tendency for wires to break loose, for connections to loosen, or for connectors to be overstressed, all of which contribute to failures in the wiring system.

Some attempts have been made to clean up the completely random and loose collection of wires. One such attempt provided for bundling groups of wires together by the use of ties. Grommets have been used around wires for protection of wires where they pass through a slot in a bracket. The various attempts did help organize the collection of wires to some limited extent, but there was no set structure used in assembling the wires with the result that the wires were still generally disorganized and subject to the same problems as mentioned above.

DISCLOSURE OF INVENTION

The present invention is directed to overcoming one or more of the problems as set forth above.

According to the present invention, a bracket assembly is provided for a dash panel which supports at least two electrical components extending therethrough. The bracket has a first part connected to a second part to form a trough therebetween. The first part has a back portion for attaching the bracket to the dash panel. The electrical components extend through the back portion and project in spaced relation to the trough. The second part of the bracket has a support portion with at least two open ended keyhole slots formed therein. A cable is disposed in the trough and has one set of selected wires to which connectors are attached. One of the connectors is connected to a mating connector on one of said electrical components. A grommet is snapped over a portion of each of said selected wires with said grommet and wire being seated in one of said keyhole slots in close proximity to said electrical component. A second set of selected wires from the cable has a second connector attached at the end of each wire with said second connectors engaging with mating connectors on the electrical component whereby the bracket supports said cable and protects said electrical components. The dash panel is provided with the improved two-part bracket assembly which organizes the wiring of the panel and reduces the incidents of loose connections and shorts in the wiring.

Due to the support provided for the wires, the connections are not likely to work loose or to short out. Most of the wires for the panel are in the bundle with appropriate leads running to the appropriate component in an organized fashion. In this way, the connections are not likely to work loose and, in the event repair is necessary, it is immediately apparent what wire or wires need attention.

BEST MODE FOR CARRYING OUT THE INVENTION

Figures 1, 2:
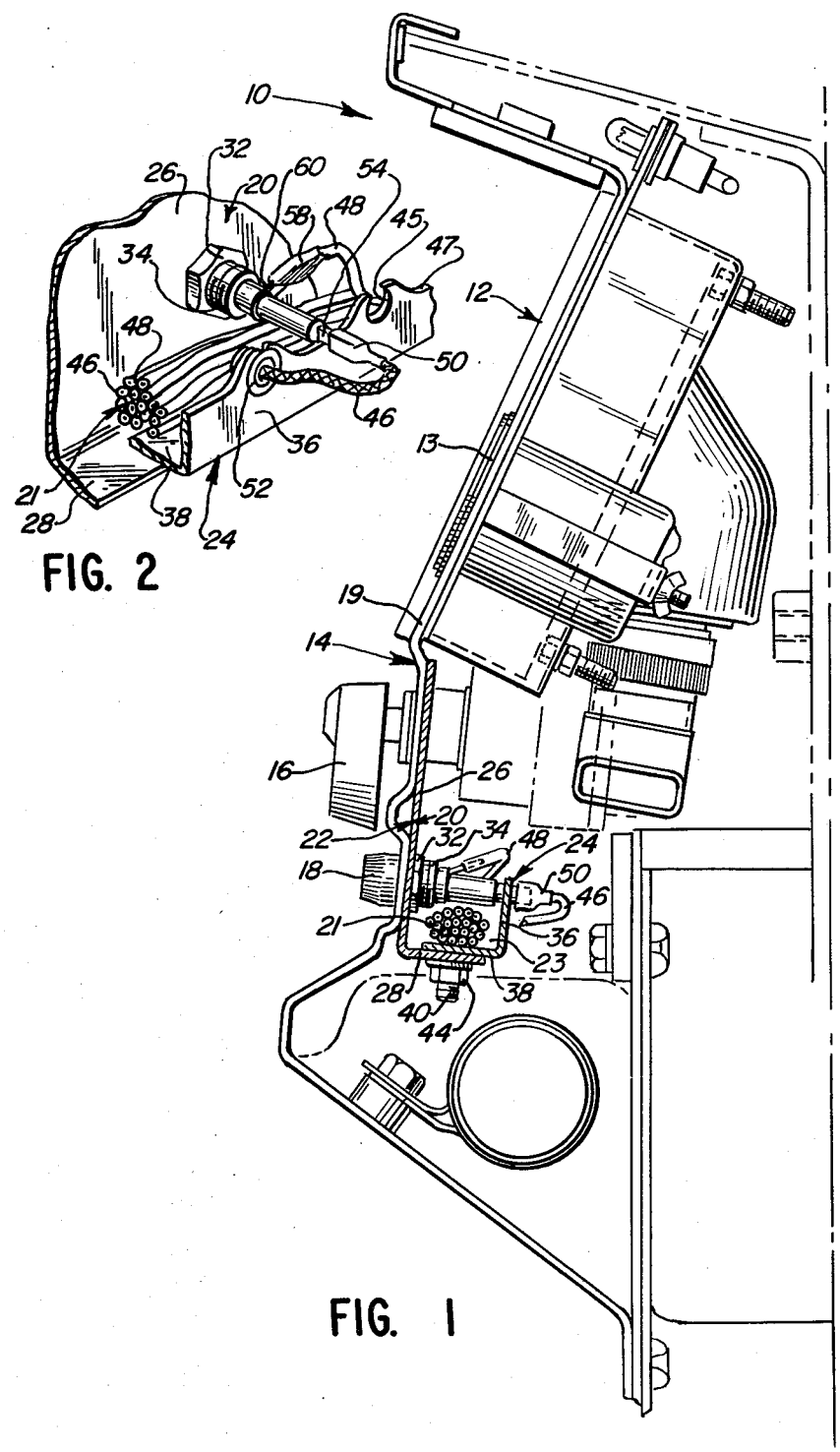
FIG. 1 is a cross-sectional view through a dash panel and console.
FIG. 2 is a slightly enlarged broken away perspective view of the cable and bracket assembly.

Referring to the drawings, and in particular to FIG. 1 thereof, a vertical cross section is taken through a dash panel or console 10, such as the dash of a tractor or the like. The particular dash panel 10 includes both a monitor panel 12, to which is mounted a plurality of gauges 13, such as a temperature gauge, or the like, and a control panel 14, to which is mounted certain controls 16, such as a starter switch, or the like, and a plurality of fuse holders 18, or the like. It should be understood that monitor and control functions may be interchanged between panels if desired. Normally, in assembling and wiring the dash panel 10, the whole front plate 19, including the monitor panel 12 and control panel 14, is loosened and is pivoted forward to provide access to the rear of the panel. Mounted behind the control panel 14 is a bracket assembly 20 which is secured to the back portion of the control panel 14 and through which a plurality of the fuse holders 18 project. The bracket 20 supports a cable or bundle of wires 21 in a trough 23 as will be described in detail hereinafter. Although the bracket 20 and cable 21 are described with respect to a monitor panel and/or a control panel, it should be recognized that said bracket 20 and cable 21 structure could be used with any panel having a plurality of wires connected to a plurality of elements.

The bracket assembly 20 is comprised of two parts or portions 22 and 24. Part 22 is an L-shaped elongate member having the long side or back 26 extending at substantially a right angle to the short side or platform 28 thereof. The back 26 of the part 22 is secured to the control panel 14 and to a display mask 30 by means of nuts 32 threaded on the barrel 34 of the fuse holders 18 and by other appropriate attaching means. The second part 24 of the bracket assembly 20 is an angled member having a support wall 36 and a base wall or platform 38. The platform 38 has two or more threaded studs 40 projecting downwardly therefrom. The platform 28 of the part 22 has spaced apart notches 42 (FIG. 3) cut into the edge of the platform such that the studs 40 from the second part 24 can be inserted in the notches 42 and appropriate means, such as a nut 44, or the like, is threaded thereon to fix the platform 38 of the second part 24 to the platform 28 of the first part 22. The depth of the notches 42 in the platform 28 is such that the width of the trough 23, created by the upstanding support wall 36 of the second part 24 and the back 26 of the first part 22, can be varied. As can be seen in the perspective view of FIG. 2, the second part 24 has the platform 38 overlapping with the platform 28 of the first part 22 with the two being bolted relative to each other by means of the fasteners discussed.

The second part 24 of the bracket 20 has a plurality of spaced apart, open-ended keyhole slots 45 formed in the support wall 36. The slots 45 open upward through the free edge 47 of the second part 24.

The cable 21, which is comprised of a bundle of individual wires 46,48, is positioned in the trough 23 whereupon an individual wire 46 is removed from the bundle and a female connector 50 is secured to the end thereof. A split grommet 52 is snapped over the intermediate portion of the wire 46, which grommet 52 and wire 46 are then snapped down into one of the open-ended keyhole slots 45 formed in the support wall 36 of the second part 24. The connector 50 is connected with a male blade connector 54 on the fuse holder 18, or the like. The grommet 52 and stretch of wire 46 beyond the grommet 52 and to the connector 50, is relatively short and is supported by the support wall 36 to prevent the wire from moving and, thereby, loosening the connector 50 from the connector 54. A second wire 48 is extracted from the bundle and has a connector 58 attached to the end thereof. The connector 58 engages with a mating male connector 60 carried by the fuse holder 18 so that now the wiring is complete to that particular fuse holder 18. As the cable 21 progresses down the trough 23 formed by the first part 22 and the second part 24, individual wires are extracted from the bundle and after attaching a connector to the ends of the wires and placing a split grommet 52 around appropriate wires, the grommet 52 and wire is snapped into an appropriate keyhole slot 45 and the connector is connected to the appropriate connector on a control element.

Figure 3:
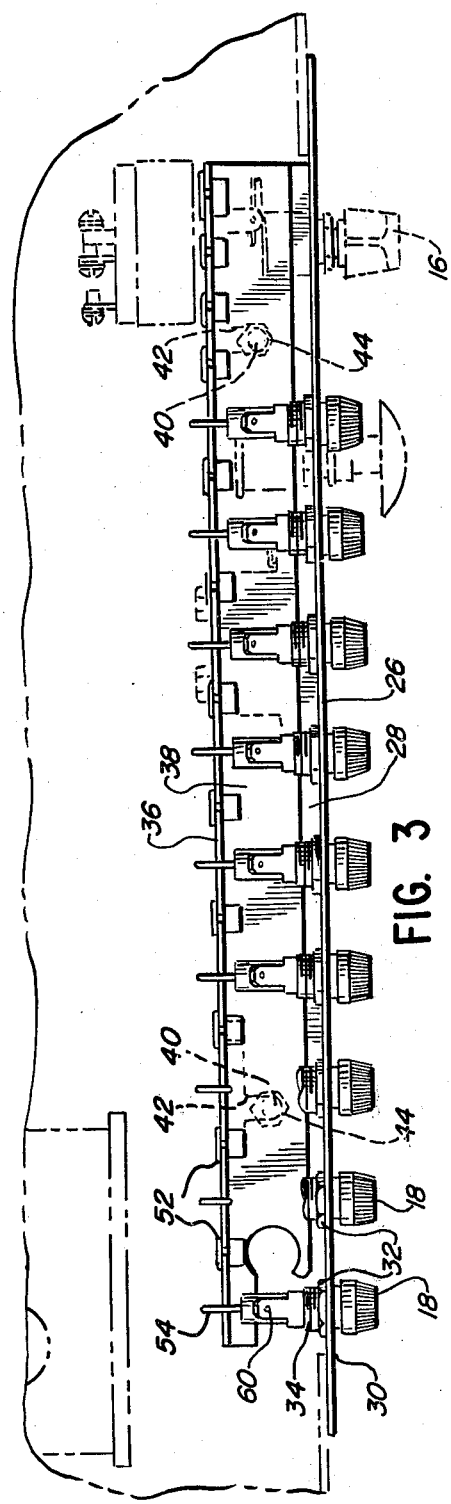
FIG. 3 is a top plan view of one portion of the panel showing the relationship of the bracket assembly, in this view the bundle of wires and the connections of the wires to, for instance, fuse holders, have been eliminated for clarity purposes; and, FIG. 4 is a front view of the fuse holder portion of the panel with a small portion broken away.
Figure 4:
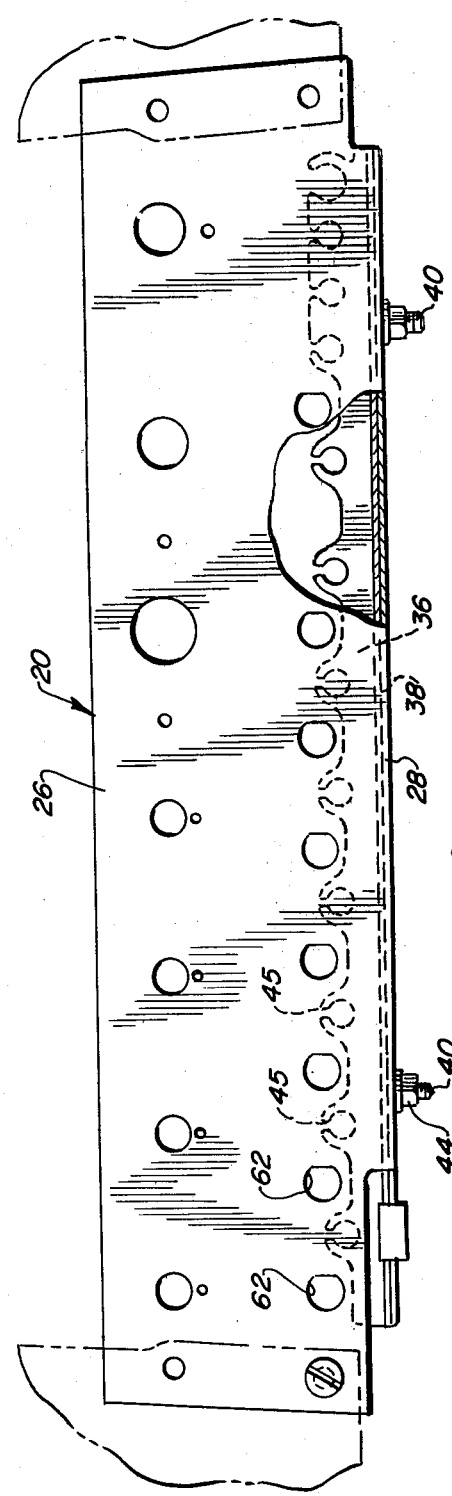

As shown in FIGS. 3 and 4, the bracket 20 extends from one side to the other of the dash panel 10 and is secured thereto as by screws, or the like. The upwardly extending back 26 of the L-shaped part 22 has a plurality of openings 62 through which the threaded barrel 34 of each fuse holder 18 is inserted with the nut 32 drawn up tight to secure the first part 22 of the bracket 20 to mask 30 of the dash panel 10. In FIGS. 2 and 4, the open-ended keyhole slots 45 are clearly visible, and in FIGS. 2 and 3, the grommets 52 are shown in the keyhole slots 45, although the cable 21 and wires 46,48 have been removed from the trough 23 to simplify the drawings.

With the bracket 20 assembled with the dash panel 10, the trunk line or cable 21 is placed in the trough 23, which trunk line 21 contains the majority of the wires to be connected. An assembler moves from one end of the bracket 20 to the other and he separates from the bundle the wires 46 or 48 that are to be connected to the switch, gauge 13, fuse holder 18, or the like. Once he extracts the wire from the bundle, he attaches a connector, snaps on a grommet 52, which grommet and wire are inserted into the open-ended keyhole slot 45. The rest of the bundle is then tied off as the assembler moves on to the next switch, gauge 13, fuse holder 18, or the like, whereupon the same procedure is followed and repeated until the whole panel is wired. The bundle of wires 21 lies within the confines of the bracket 20 so it is not possible to move or displace the cable 21 a sufficient amount to work the connections of the wires to the components loose.

The construction of the bracket assembly 20 is such that it serves to protect the rear of the fuse holders 18, or the like, from damage. The grommets 52 and open-ended keyhole slots 45 serve to anchor the wires and, since there is no excessive length of loop to be subjected to vibration, the wired components are more reliable. In addition, since the wires are short and run in a direct line pattern to their connectors, rewiring is generally simplified because the component that is not working can be identified and the wires leading to that component can be easily traced and repaired. The bracket assembly 20 organizes and simplifies the wiring and serves as a protector for the components and their connections thereby preventing damage or disconnection during assembly and disassembly of the dash panel.

We claim:

1. A bracket assembly (20) for a wired panel (10) having at least two electrical components (18) extending therethrough, said bracket assembly (20) having a first part (22) connected to a second part (24) to form a trough (23) therebetween, said first part (22) having a back portion (26) for attaching said bracket assembly (20) to said panel (10), said electrical components (18) extending through said back portion (26) and projecting in spaced relation to said trough (23), said second part (24) having a support portion (36) with at least two open-ended keyhole slots (45) formed therein, a cable (21) disposed in said trough (23), a set of selected wires (46) from said cable (21) having connectors (50) attached at the free ends thereof, said connectors (50) being connected to a mating connector (54) on one of said electrical components (18), a grommet (52) snapped over a portion of each of said selected wires, said grommet (52) and wire (46) being seated in one of said keyhole slots (45) in close proximity to said electrical component (18), and a second set of selected wires (48) from said cable (21) having second connectors (58) attached at the ends thereof, said second connectors (58) engaging with mating connectors (60) on said electrical components (18).

2. A bracket assembly (20) as claimed in claim 1 wherein said first part (22) has a platform (28) extending transverse to said back portion (26) and said second part (24) has a base portion (38) extending transverse to said support portion (36) and means (40,44) extending between said platform (28) and said base portion (38) to secure said two parts (22,24) together.

3. A bracket assembly (20) as claimed in claim 2 wherein said means (40,44) comprises a pair of fasteners (40) carried by said base portion (38) and a pair of nuts (44) threaded thereon, and wherein said platform has a pair of notches (42) into which said fasteners extend prior to tightening said nuts (44) on said fasteners.

4. A bracket assembly (20) for a wired panel (10) having a plurality of electrical components (18), said bracket assembly (20) being comprised of an elongate L-shaped first part (22) and an angled second part (24), said first part (22) having a back portion (26) and a platform portion (28), said electrical components (18) extending through said back portion (26) and being secured thereto, a pair of spaced apart notches (42) formed in the exposed edge of said platform portion (28), said second part (24) having a support portion (36) and a base portion (38), said support portion (36) having a plurality of open-ended keyhole slots (45) formed in the upwardly extending support portion (36) thereof, spaced apart fasteners (40) projecting from said base portion (38) and engaging in said notches (42), means (44) associated with the fasteners (40) for securing the two parts (22,24) of the bracket assembly (20) together to form a trough (23) therein, a cable (21) in said trough (23), a first set of selected wires (46) extracted from said cable (21) and having a connector (50) attached to the free end of each selected wire, each said connector (50) being connected to a mating connector (54) on one of said electrical components (18), a grommet (52) snapped over a portion of each of said selected wires (46), each said grommet (52) and selected wire (46) seating in one of said keyhole slots (45) close to one electrical component (18), and a second selected set of wires (48) extracted from said cable (21) and having a second connector (58) attached to the end of each second set of wires (48), each said second connector (58) engaging with a mating connector (60) on each said electrical component (18) whereby said bracket assembly (20) protects said components (18) and the connections therewith.

* * * * *